United States Patent [19]

Lewis

[11] 4,237,989
[45] Dec. 9, 1980

[54] CAPACITIVE LOAD CELL AND METHOD OF MANUFACTURE

[75] Inventor: Howard B. Lewis, Evergreen, Colo.

[73] Assignee: National Controls, Inc., Santa Rosa, Calif.

[21] Appl. No.: 38,328

[22] Filed: May 11, 1979

Related U.S. Application Data

[63] Continuation-in-part of Ser. No. 910,833, May 30, 1978, abandoned.

[51] Int. Cl.³ .......................... G01G 3/14; G01L 5/12
[52] U.S. Cl. .............................. 177/210 C; 73/141 A
[58] Field of Search .................... 177/210 C; 361/283, 361/287, 290; 73/141 A

[56] References Cited

U.S. PATENT DOCUMENTS

| 2,968,031 | 1/1961 | Higa | 361/290 X |
| 3,332,506 | 7/1967 | Bradfield | 177/210 C |
| 3,602,866 | 8/1971 | Saxl | 361/283 X |
| 3,715,638 | 2/1973 | Polye | 361/283 X |
| 3,995,696 | 12/1976 | Kainer et al. | 73/141 A X |
| 4,040,118 | 8/1977 | Johnston | 361/283 |

FOREIGN PATENT DOCUMENTS

2270567 9/1976 France .............................. 177/210 C

OTHER PUBLICATIONS

R. F. Graf, Radio Shack Dictionary of Electronics, Howard W. Sams & Co., Inc., Indianapolis, Indiana, 4th Edition, 1972, p. 90.

*Primary Examiner*—George H. Miller, Jr.
*Attorney, Agent, or Firm*—Flehr, Hohbach, Test, Albritton & Herbert

[57] ABSTRACT

A capacitive load cell having a body fabricated of a ceramic material and having substantially rigid outer arms and a relatively flexible central arm. Electrically conductive plates are carried by the arms in facing relationship, and a load is applied to the central arm to flex the same and change the spacing between the plates.

8 Claims, 12 Drawing Figures

U.S. Patent    Dec. 9, 1980    Sheet 1 of 4    4,237,989
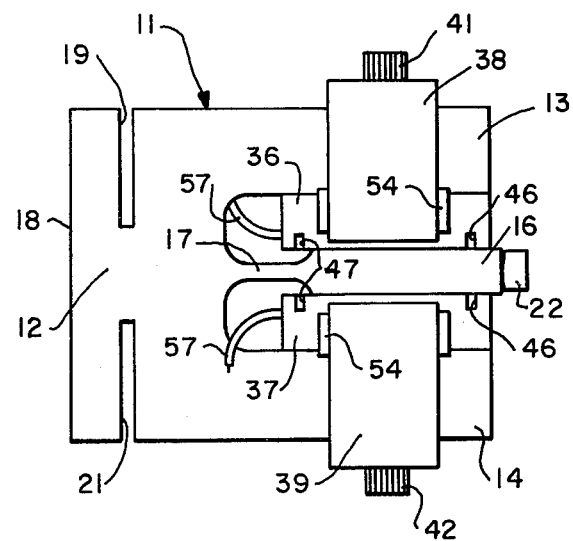
FIG.—1
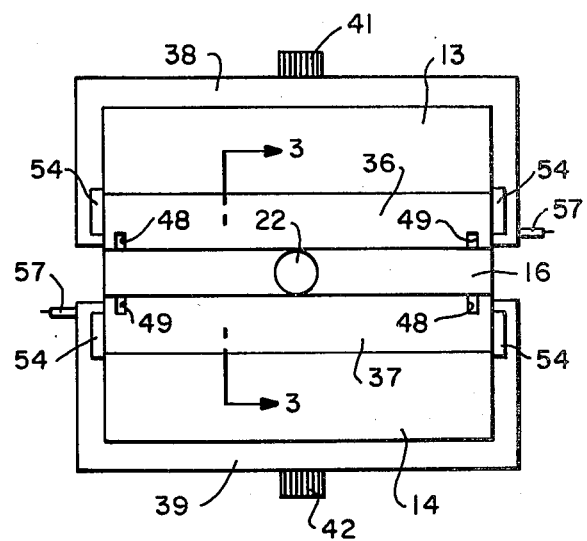
FIG.—2
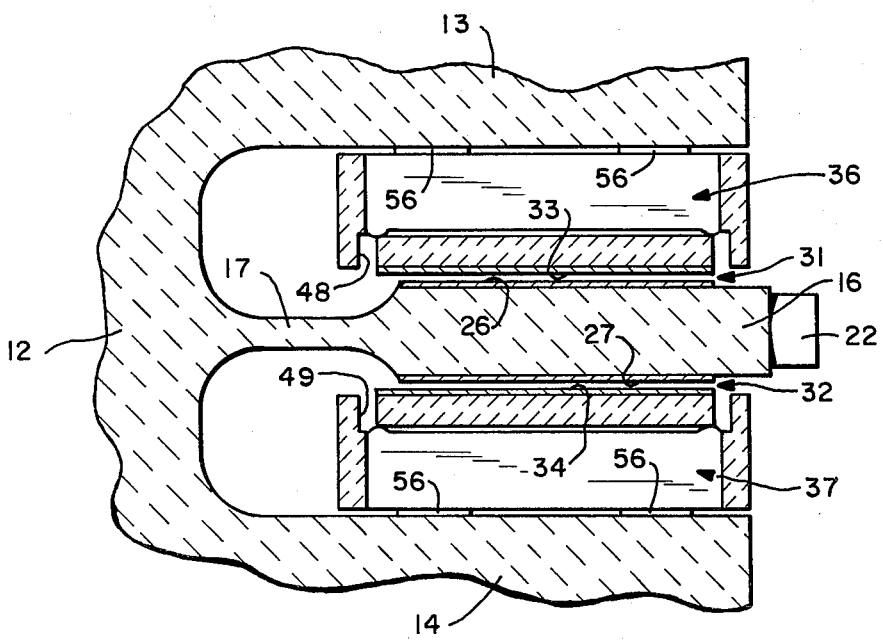
FIG.—3

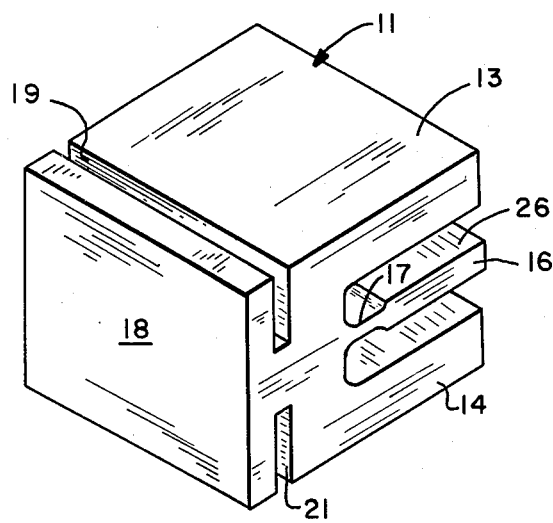
FIG.—4
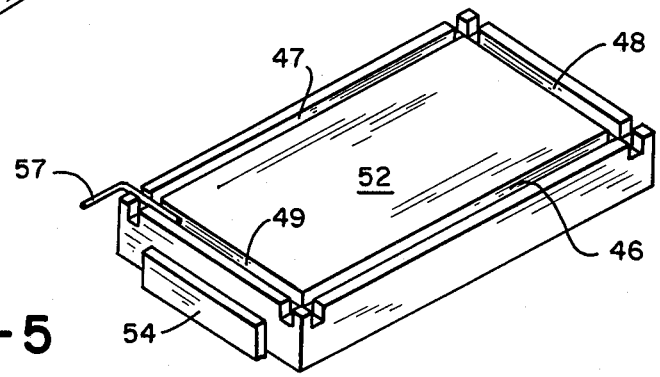
FIG.—5
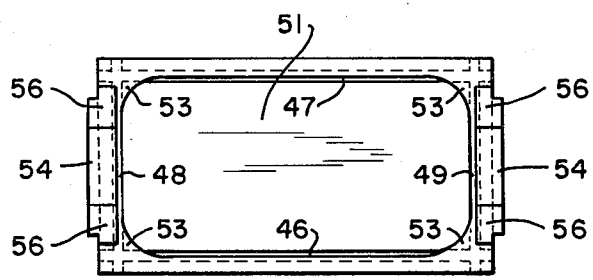
FIG.—6
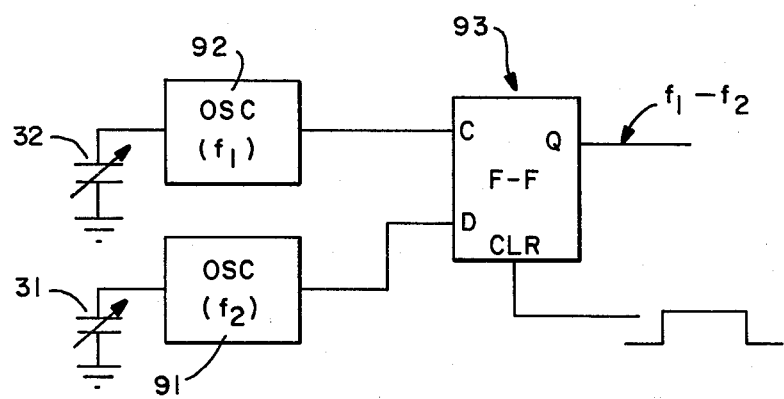
FIG.—9

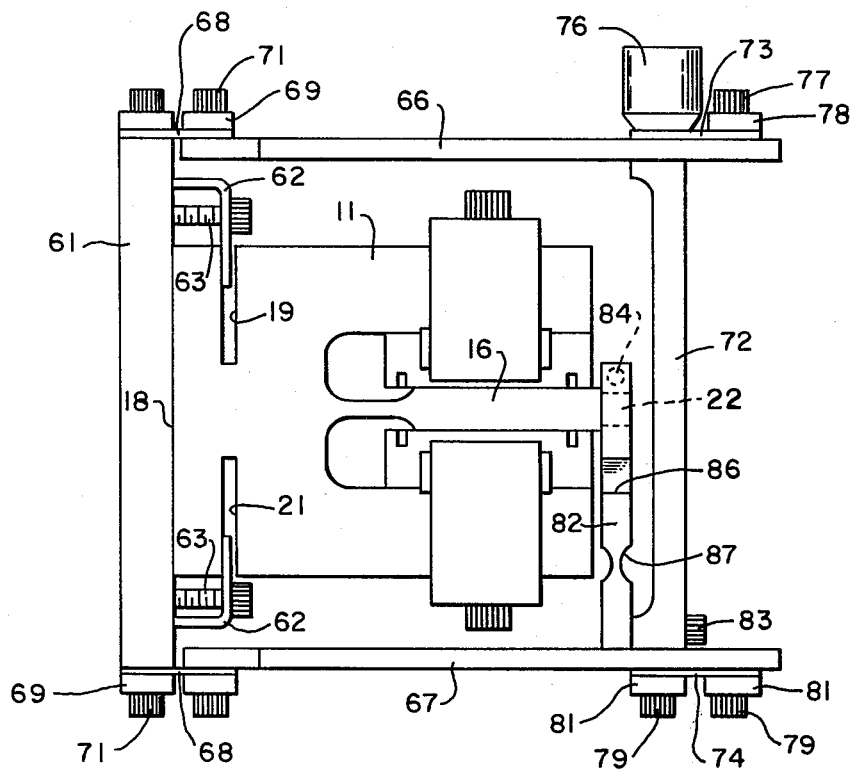
FIG.—7
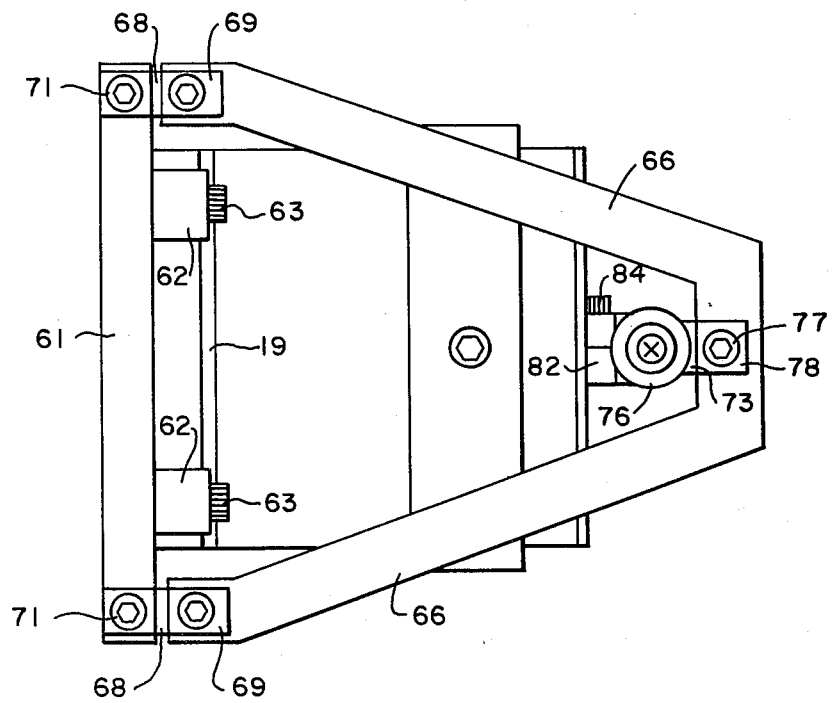
FIG.—8

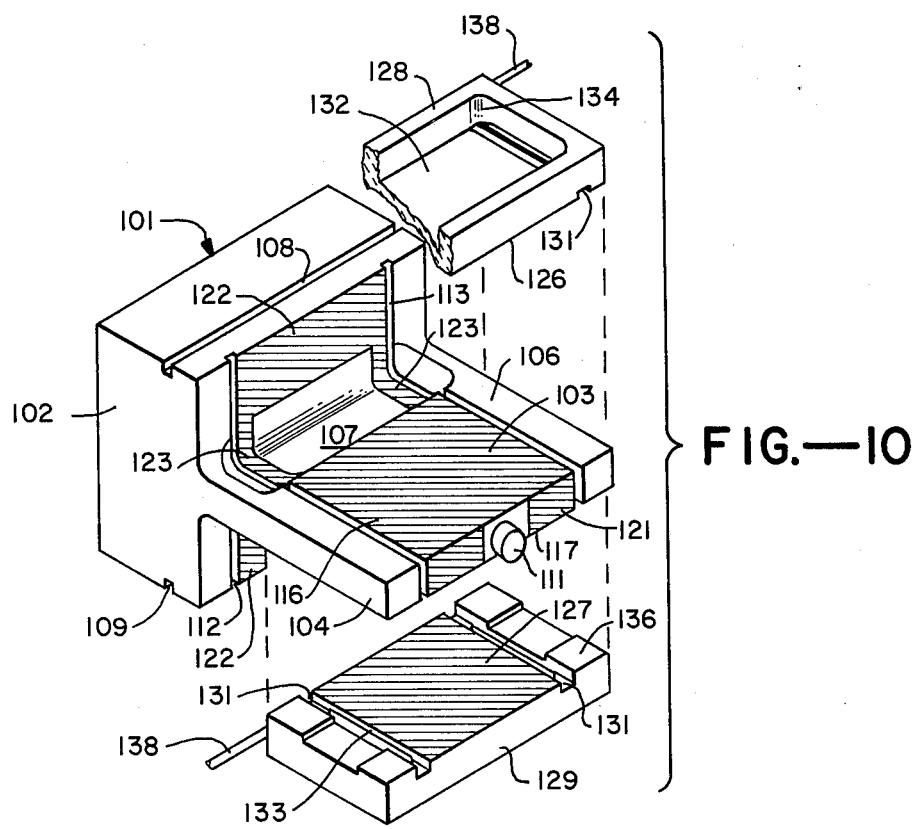
FIG.—10
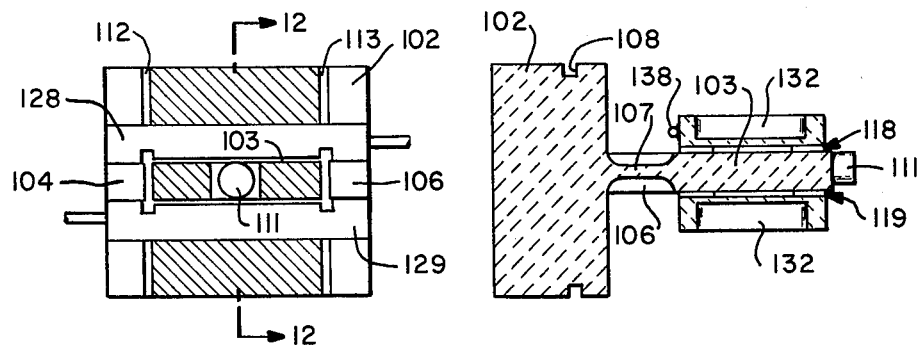
FIG.—11  FIG.—12

CAPACITIVE LOAD CELL AND METHOD OF MANUFACTURE

This application is a continuation-in-part of Ser. No. 910,833, filed May 30, 1978 and assigned to the assignee herein, now abandoned.

This invention pertains generally to force transducers and more particularly to a load cell of the type having an electrical capacitance dependent upon an applied force, such as the weight of a load.

The invention has particular applicability to electronic scales, especially scales which provide a digital output signal or weight display. Load cells heretofore provided for use in such scales have generally included bending members of materials which exhibit hysteresis and creep which can cause inaccurate readings and otherwise limit the accuracy and resolution of the scales.

Applicant has found that a ceramic material, which heretofore was thought to be too brittle for use in bending elements, exhibits almost perfect elasticity at room temperature and other temperatures within the range in which scales are normally operated. A load cell having a bending member of ceramic material has been found to be substantially free of hysteresis and creep and to provide significantly more accurate readings and greater resolution than do load cells utilizing conventional materials.

The invention provides a capacitive load cell having a first plate mounted in a fixed position and a second plate mounted on an arm of ceramic material in facing relationship with the first plate. Loads applied to the load cell cause the ceramic arm to flex, changing the spacing between the plates to provide a capacitance corresponding to the load. In one preferred embodiment, a body is formed from a block of ceramic material with a pair of substantially rigid outer arms and a relatively flexible central arm. Metalization layers are formed on the central arms, and stator plates are carried by the outer arms in facing relationship with the metalization layers on the central arm.

It is in general an object of the invention to provide a new and improved capacitive load cell and method of manufacturing the same.

Another object of the invention is to provide a load cell of the above character which overcomes the problems of hysteresis and creep of prior art load cells.

Additional objects and features of the invention will be apparent from the following description in which the preferred embodiments are set forth in detail in conjunction with the accompanying drawings.

FIG. 1 is a side elevational view of one embodiment of a load cell according to the invention.

FIG. 2 is a front elevational view of the load cell of FIG. 1.

FIG. 3 is an enlarged fragmentary cross-sectional view taken along line 3—3 in FIG. 2.

FIG. 4 is a rear isometric view of the body of the load cell of FIG. 1.

FIG. 5 is an isometric view of one of the stator plates of the load cell of FIG. 1.

FIG. 6 is a bottom plan view of one of the stator plates of the load cell of FIG. 1.

FIG. 7 is a side elevational view of the load cell of FIG. 1 mounted on a backplate with a lever system for applying loads to the load cell.

FIG. 8 is a top plan view of the apparatus of FIG. 7.

FIG. 9 is a block diagram of one embodiment of a circuit employing the load cell of FIG. 1.

FIG. 10 is an exploded isometric view, partly broken away, of a second embodiment of a load cell according to the invention.

FIG. 11 is a front elevational view of the embodiment of FIG. 10.

FIG. 12 is a cross-sectional view taken along line 12—12 in FIG. 11.

As illustrated in FIGS. 1-6, the load cell includes a generally E-shaped body 11 and a central arm 16 extending horizontally therefrom. The upper and lower arms are substantially rigid, and the central arm is relatively flexible, being formed with a region 17 of reduced thickness extending laterally across the arm near base 12. A generally planar mounting surface 18 is provided at the rear of the base, and vertically extending stress relief slots 19,21 open through the upper and lower surfaces of the base in the region between the mounting surface and arms. A cylindrical post 22 projects outwardly from the free or front end of central arm 16 for receiving loads applied to the load cell.

Body 11 is fabricated as a unitary structure from a block of ceramic material such as alumina. One particularly preferred material is AD-995 alumina from Coors Porcelain Company, Golden, Colorado. This material contains 99.5% $Al_2O_3$ by weight and 0.5% other oxides such as silica, magnesia and calcia. This material exhibits almost perfect elasticity, and other ceramic materials having similar properties can also be used.

Metalization layers 26,27 are provided on the upper and lower surfaces of central arm 16 toward the free end thereof. As discussed more fully hereinafter, these layers form plates of capacitors 31,32 which change in value in accordance with the applied load. The metalization layers are formed by applying a paste containing silver and glass particles suspended in a suitable vehicle to the surfaces of the arm. The material is then fired at a temperature on the order of 900° C. to diffuse the glass and form a bond with the ceramic. Layers of metalization are also applied to the front, side, top and bottom surfaces of the body, and these layers are connected together electrically with each other and with layers 26,27. In the preferred embodiment, these layers are connected to the circuit ground and maintained at ground potential.

Capacitors 31,32 have fixed stator plates in the form of metalization layers 33,34 on stator pieces or insert members 36,37 mounted on arms 13,14. The insert members are fabricated from generally rectangular blocks of ceramic material such as Coors AD-995 alumina. Metalization layers 33,34 are fabricated of the same material and in the same manner as metalization layers 26,27. Metalization is also applied to the front and side surfaces of the insert members, and the metalization on these surfaces is connected together to form a continuous conductor which is insulated from metalization layers 33,34. The insert members are secured to arms 13,14 by clamps 38,39 and screws 41,42. The clamps are fabricated of an electrically conductive material, such as aluminum, which engages the electrically conductive surfaces of the body and inserts and provides electrical continuity between the same.

The upper and lower insert members are identical, although upper member 36 is mounted in an inverted position relative to lower member 37. One of these members is illustrated in detail in FIGS. 5 and 6. Isolation slots 46-49 are formed in the surface of the member which faces the central arm of the body, and a recessed area 51 is formed in the side which faces the arm on which the member is mounted. The isolation slots extend generally parallel to the front, rear and side edges of the member and defined an island 52 on which the metalization layer is formed. The slots provide electrical isolation between the plate and the metalization on the outer surfaces of the insert member and prevent fringing at the edges of the capacitor. The corners 53 of recessed area 51 are formed with a radius, and slots 46-49 open into the recessed area between the corners.

The insert members also include ears 54 which protrude from the sides thereof for engagement by clamps 38,39. Mounting pads 56 are formed toward the corners of the insert members for engagement with the arms on which the members are mounted. Wires 57 are soldered to metalization layers 33,34 to provide electrical connections with the stator plates.

In one presently preferred embodiment, the spacing between the plates of capacitors 31,32 is on the order of 0.005 inch, and the deflection produced by a load applied to central arm 22 is on the order of 0.0002 inch. The use of the insert members greatly facilitates the manufacture of the load cell with these dimensions and the close tolerances required thereby.

In the preferred method of manufacture for the load cell of FIGS. 1-6, body 11 and insert members 36,37 are formed from generally rectangular blocks of ceramic material by a suitable machining process such as grinding. The metalization layers are formed on the desired surfaces of the body and insert members before the insert members are mounted on the body. The metalization can be applied by any suitable process such as plating or applying a paste consisting of silver and glass particles in a suitable vehicle to the surfaces, then firing the pieces at a temperature on the order of 900° C. to diffuse the glass and form bonds. The electrical leads are then soldered in place, and the insert members are mounted on the upper and lower arms of the body and secured thereto by clamps 38,39.

In the embodiment of FIGS. 7-8, the load cell is mounted on a rigid backplate 61 by means of mounting brackets 62 and screws 63. The mounting brackets extend into slots 19,21 and clamp the mounting surface 18 of the body securely to the front surface of the backplate.

Generally parallel A-shaped lever arms 66,67 are pivotally mounted on the backplate above and below the load cell by means of flexure plates 68. These plates are affixed to the backplate and the lever arms by clamping plates 69 and screws 71. A load bridge 72 extends between the lever amrs in front of the load cell and is pivotally connected to the lever arms by flexure plates 73,74. A fitting 76 is mounted on the upper end of the load receiving member of a scale, and one end of flexure plate 73 is clamped between this fitting and the upper end of the load bridge. The other end of flexure plate 73 is affixed to lever arms 66 by a screw 77 and a clamping plate 78. Flexure plate 74 is secured to lever arm 67 and to the lower end of the load bridge 72 by means of screws 79 and clamping plates 81.

A tie rod 82 extends between the lower end of load bridge 72 and central arm 16 of the load cell. The lower end of the tie rod is secured to the lower end of the load bridge by a screw 83, and the upper end of the tie rod is attached to post 22 and secured by a screw 84. Portions of the tie rod are cut away to form flexures 86,87 oriented in vertical planes which are generally perpendicular to each other.

Operation and use of the load cell are described with reference to FIGS. 7 and 8. It is assumed that a platter or other suitable load receiving member is mounted on fitting 76. The application of a load to the platter produces a downward deflection of load bridge 72, which is transmitted to central arm 16 of the load cell by tie rod 82. This causes the central arm to flex, increasing the spacing between the plates of capacitor 31 and decreasing the spacing between the plates of capacitor 32. Since the amount of deflection is dependent upon the magnitude of the load, the capacitance of each capacitor likewise corresponds to the load. It will be noted that the values of the two capacitances change in opposite directions, with the value of capacitor 31 decreasing and the value of capacitor 32 increasing with increasing loads. Parallel arms 66,67 and flexible tie rod 82 serve to isolate the load cell from the effects of side loading, i.e., the application of loads away from the center of the platform. Stress relief slots 19,21 serve to further decouple the load cell from distortion-producing loads.

A preferred circuit utilizing the load cell is illustrated in FIG. 9. Capacitors 31,32 are connected to oscillators 91,92 as frequency-determining elements. The outputs of the oscillators are connected to a mixer 93, and the output of the mixer is a signal corresponding to the frequency difference between the oscillator signals.

In the preferred embodiment, mixer 93 comprises a D-type flip-flop. The output of oscillator 91 is applied to the D input of the flip-flop, and the output of oscillator 92 is applied to the clock input. A count gating pulse is applied to the CLEAR input of the flip-flop. For frequencies in the range defined by the relationship $$\tfrac{1}{2} < f_1/f_2 < 2,$$

the frequency of the signal at the Q output of the flip-flop has the value of $f_1 - f_2$, where $f_1$ is the frequency of the signal applied to the clock input and $f_2$ is the frequency of the signal applied to the D input.

The frequencies of the signal produced by the oscillators are non-linear functions of the deflection of the capacitor plates, being proportional to the square roots of the capacitances. However, the difference of these two non-linear functions is a function which is substantially linear. The output of the flip-flop is a square wave even though the input signals applied to the flip-flop are not square waves. Thus, the load cell and the circuit of FIG. 9 provide a simple and direct method of generating a digitalized signal which is a linear function of the load applied to a scale.

In the embodiment of FIGS. 10-12, the load cell includes a generally T-shaped body 101 having a generally rectangular upright base 102 with a central arm 103 and side arms 104,106 extending from the base in a generally horizontal plane. Arms 104,106 are substantially rigid, and central arm 103 is relatively flexible in the vertical direction, being formed with a region 107 of reduced thickness adjacent to base 102. Horizontally extending slots 108,109 extend through the upper and lower surfaces of base 102 and are adapted to receive mounting brackets similar to brackets 62,63. A cylindrical post 111 projects outwardly from the free or front end of central arm 103 for receiving loads applied to the load cell, and vertically extending stress relief slots 112,113 in the front face of body 102 isolate outer arms 104,106 from stress in the base.

As in the embodiment of FIGS. 1-6, body 101 is fabricated as a unitary structure from a block of ceramic material such as alumina.

Metalization layers 116,117 are provided on the generally planar upper and lower surfaces of central arm 103. These layers form plates of capacitors 118,119 which change in value in accordance with the vertical load applied to the central arm. Plates 116,117 are connected together by metalization 121 on the front side of arm 103 and by additional metalization 122 on the front face of the base, with strips 123 interconnecting the plates and metalization 122. As in the embodiment of FIGS. 1-6, the metalization layers are connected to the circuit ground and maintained at ground potential.

Capacitors 118,119 have fixed stator plates in the form of metalization layers 126,127 on insert members or stator pieces 128,129 mounted on outer arms 104,106. The stator pieces are fabricated from generally rectangular blocks of ceramic material such as alumina, and the two stator pieces are identical, although upper stator piece 128 is mounted in an inverted position relative to lower stator piece 129. Isolation slots 131 are formed in the surface of the stator piece which faces the central arm of body 101, and a recessed area 132 is formed in the side which faces away from the central arm. The isolation slots extend generally parallel to the side edges of the stator piece and define an island 133 on which the metalization layer is formed. The corners 134 of recessed area 132 are rounded, and slots 131 open into the recessed area between the corners.

The stator pieces also include pads or feet 136 which engage the outer arms to establish the desired spacing between the metalization layers on the central arm and stator pieces. The stator pieces are secured to the outer arms by suitable means such as cementing. In one presently preferred embodiment, the stator plates are positioned with the pads in coneact with the arms, and a drop of cement is applied to the edge of the joint between each pad and arm. The cement is drawn into the joints by capillary action. Wires 138 are soldered to metalization layers 126,127 to provide electrical connections with the stator plates.

As in the embodiment of FIGS. 1-6, the plates of capacitors 118,119 are maintained in a spaced parallel relationship, with a spacing on the order of 0.005 inch. The deflection produced by a load applied to central arm 103 is on the order of 0.0002 inch.

In the preferred method of manufacture for the load cell of FIGS. 10-12, body 101 and stator pieces 128,129 are formed from generally rectangular blocks of ceramic material by a suitable machining process such as grinding. The metalization layers are formed on the desired surfaces of the body and stator pieces before the stator pieces are mounted on the body. As in the embodiment of FIGS. 1-6, the metalization can be applied by any suitable process such as plating or applying a paste consisting of silver and glass particles in a suitable vehicle to the surfaces, then firing the pieces at a temperature on the order of 900° C. to diffuse the glass and form bonds. The electrical leads are then soldered in place, and the stator pieces are mounted on arms 104,106.

The load cell of FIGS. 10-12 can be mounted in a frame of the type illustrated in FIGS. 7-8 and can be utilized in a manner similar to that of the load cell of FIGS. 1-6.

It is apparent from the foregoing that a new and improved load cell and method of manufacture have been provided. While only certain presently preferred embodiments have been described, as will be apparent to those familiar with the art, certain changes and modifications can be made without departing from the scope of the invention as defined by the following claims.

What is claimed is:

1. In a load cell: a first plate of electrically conductive material mounted in a fixed position, an arm of ceramic material rigidly mounted at one end thereof, a second plate of electrically conductive material carried by the ceramic arm in facing relationship to the first plate, and means for applying a load to the ceramic arm to flex the arm and change the spacing between the plates to provide a capacitance corresponding to the load.

2. In a load cell: a body of ceramic material having substantially rigid outer arms and a relatively flexible central arm, electrically conductive plates carried by outer arms in facing relationship with the central arm, electrically conductive plates carried by the central arm spaced from and facing the plates on the outer arms, and means for applying a load to the central arm to flex the same and thereby change the spacing between the plates to provide capacitances corresponding to the load.

3. The load cell of claim 2 wherein the body includes a base from which the arms extend, said base having a mounting surface on the side thereof opposite the arms and stress relief slots opening through the outer surfaces of the base between the mounting surfaces and the arms.

4. The load cell of claim 2 wherein the plates carried by the outer arms comprise metalization layers on ceramic stator pieces mounted on said arms.

5. The load cell of claim 4 wherein the stator pieces are secured to the outer arms by clamps.

6. The load cell of claim 4 wherein the stator pieces comprise insert members having isolation channels opening through the surfaces thereof facing the central arm and defining islands on which the metalization layers are formed, the peripheral side edges of the insert members being metalized and connected electrically to the plates on the central arm.

7. The load cell of claim 6 wherein the sides of the insert members facing the outer arms have recessed areas formed therein underlying the islands, the isolation channels opening into the recessed areas throughout the majority of their extent.

8. In a method of manufacturing a load cell from a block of ceramic material, the steps of: machining the block to form a body having a base with substantially rigid outer arms and a relatively flexible central arm extending therefrom, forming electrically conductive metalization layers on portions of the central arm facing the outer arms, forming electrically conductive metalization layers on the surfaces of ceramic stator pieces, thereafter placing the stator pieces on the outer arms with the metalization layers on the stator pieces facing the metalization layers on the central arm, and securing the stator pieces to the outer arms with the metalization layers thereon spaced from the metalization layers on the central arm to form capacitors which change in value when a load is applied to the central arm to flex the arm and thereby change the spacing between the metalization layers.

* * * * *